United States Patent
Burbrink

(10) Patent No.: US 7,584,867 B2
(45) Date of Patent: Sep. 8, 2009

(54) MONOLITHIC CONTAINER HOLDER

(75) Inventor: Philip W. Burbrink, Columbus, IN (US)

(73) Assignee: Cosco Management, Inc., Wilmington, DE (US)

( * ) Notice: Subject to any disclaimer, the term of this patent is extended or adjusted under 35 U.S.C. 154(b) by 670 days.

(21) Appl. No.: 10/999,023

(22) Filed: Nov. 29, 2004

(65) Prior Publication Data

US 2006/0138814 A1   Jun. 29, 2006

(51) Int. Cl.
B65D 25/00   (2006.01)
(52) U.S. Cl. .................................................. 220/737
(58) Field of Classification Search ............... 220/660, 220/480, 476; 297/188.14, 188.01, 440.16
See application file for complete search history.

(56) References Cited

U.S. PATENT DOCUMENTS

| | | | |
|---|---|---|---|
| 2,052,817 A * | 9/1936 | Evans | 220/4.04 |
| 2,122,628 A * | 7/1938 | Tracy | 220/740 |
| 2,185,907 A | 1/1940 | Alexander | |
| 2,457,294 A | 12/1948 | Wood | |
| 2,684,759 A * | 7/1954 | Freeman | 206/434 |
| 3,110,921 A * | 11/1963 | Conner | 15/257.06 |
| 3,148,636 A | 9/1964 | Bloomquist et al. | |
| 3,475,052 A | 10/1969 | Kaposi | |
| 3,690,724 A | 9/1972 | Douglas et al. | |
| 3,698,675 A | 10/1972 | Lerew et al. | |
| 3,850,296 A * | 11/1974 | Hirata et al. | 206/711 |
| 4,174,866 A | 11/1979 | Rhyan | |
| 4,191,420 A * | 3/1980 | Fassett et al. | 312/235.6 |
| 4,591,206 A | 5/1986 | Pribble | |
| 4,606,576 A | 8/1986 | Jones | |
| 4,659,099 A | 4/1987 | Malone | |
| 4,662,676 A | 5/1987 | Havelock | |
| 4,825,590 A | 5/1989 | Cullinane | |
| 4,858,869 A | 8/1989 | Stang | |
| 4,865,237 A | 9/1989 | Allen | |
| 4,909,394 A * | 3/1990 | Stewart | 206/520 |
| 4,928,876 A | 5/1990 | Marshall | |
| 4,972,781 A | 11/1990 | Montgomery et al. | |
| 5,010,826 A | 4/1991 | Kudlac | |
| 5,042,770 A | 8/1991 | Louthan | |
| 5,072,909 A | 12/1991 | Huang | |
| 5,205,452 A * | 4/1993 | Mankey | 224/275 |
| 5,279,452 A | 1/1994 | Huynh | |
| 5,361,950 A | 11/1994 | Signal et al. | |
| 5,427,292 A | 6/1995 | Rousch | |
| 5,458,394 A | 10/1995 | Nichols et al. | |
| 5,460,102 A | 10/1995 | Pasmanick | |
| 5,503,297 A | 4/1996 | Frankel | |

(Continued)

Primary Examiner—Anthony D Stashick
Assistant Examiner—Robert J Hicks
(74) Attorney, Agent, or Firm—Barnes & Thornburg LLP

(57) ABSTRACT

A monolithic container holder has a top surface and a receptacle depending from the top surface. The receptacle includes a generally bottom planar wall, a pair of end walls having a height extending between the top surface and the bottom planar wall, and a pair of side walls. Each side wall consists essentially of a concave curved section. The concave curved sections are spaced apart and arranged to receive a curved or round container therein. The end walls are spaced apart and arranged to receive a generally rectangular container therein. The monolithic container holder, or cup holder, may be formed as part of another structure such as a seat formed to support a juvenile with arms and a back, all forming a monolithic body.

15 Claims, 4 Drawing Sheets

U.S. PATENT DOCUMENTS

| | | | |
|---|---|---|---|
| 5,522,527 A | 6/1996 | Tsai | |
| 5,558,391 A | 9/1996 | Chavous | |
| D376,917 S | 12/1996 | Kain | |
| 5,586,800 A | 12/1996 | Triplett | |
| 5,662,378 A * | 9/1997 | Carruth | 297/256.15 |
| 5,685,604 A | 11/1997 | Kain | |
| 5,720,226 A | 2/1998 | Padovano | |
| 5,813,579 A | 9/1998 | Hendrickson | |
| 5,865,412 A | 2/1999 | Mason | |
| 5,918,550 A | 7/1999 | Weir et al. | |
| 5,975,342 A | 11/1999 | Bradeen et al. | |
| 6,012,585 A * | 1/2000 | Parker | 206/570 |
| 6,065,603 A * | 5/2000 | Filice et al. | 206/519 |
| 6,131,732 A * | 10/2000 | Schneider | 206/217 |
| 6,216,605 B1 | 4/2001 | Chapman | |
| 6,302,033 B1 * | 10/2001 | Roudebush | 108/25 |
| 6,360,885 B1 * | 3/2002 | Krueger et al. | 206/217 |
| 6,394,265 B1 * | 5/2002 | Tsao | 206/217 |
| 6,478,372 B1 * | 11/2002 | Lemmeyer et al. | 297/188.18 |
| 6,533,233 B2 * | 3/2003 | Thomas | 248/311.2 |
| 6,592,180 B2 * | 7/2003 | Combs | 297/188.14 |
| 2004/0090094 A1 | 5/2004 | Williams et al. | |
| 2006/0118453 A1 * | 6/2006 | Hillebrecht et al. | 206/562 |

* cited by examiner

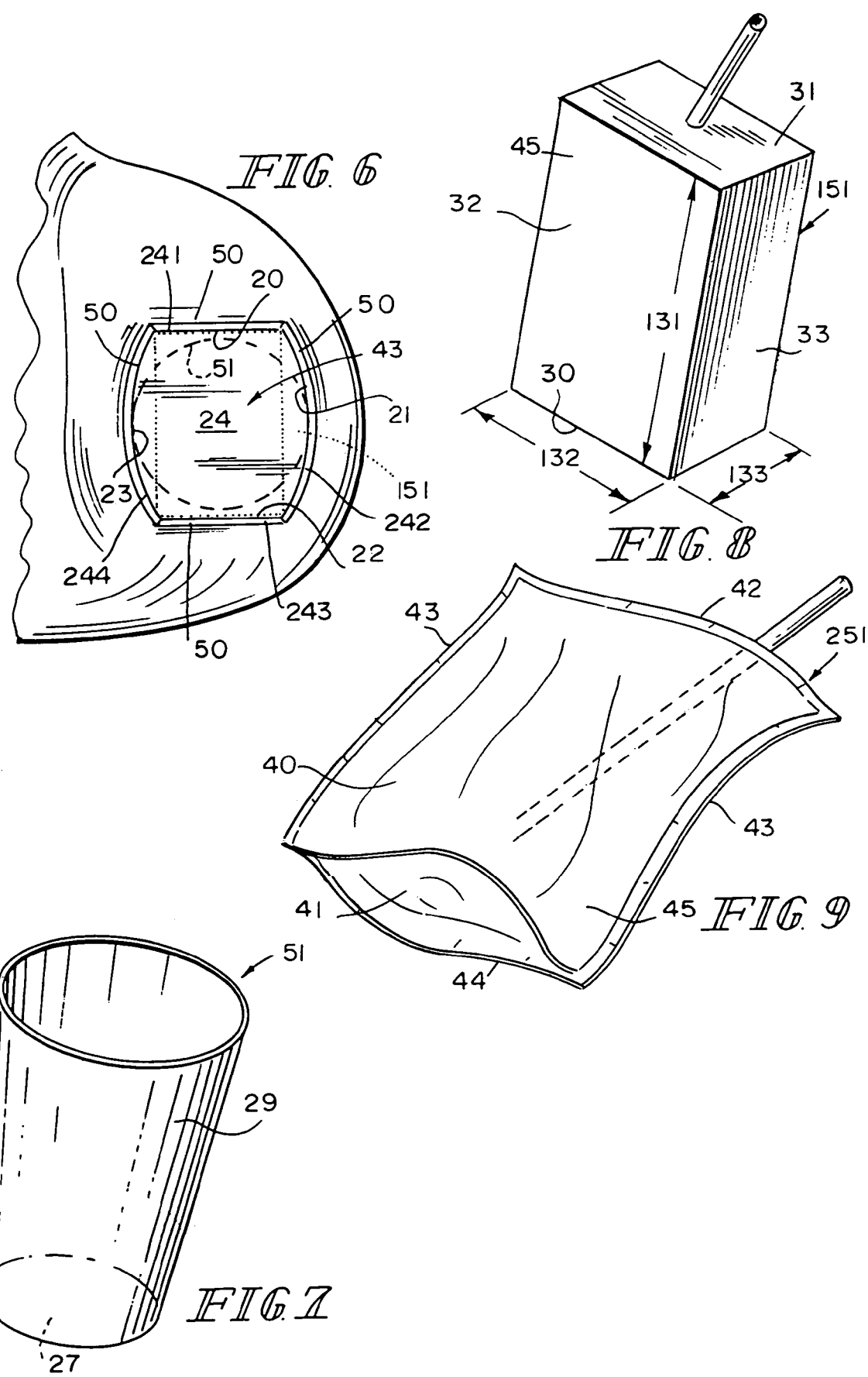

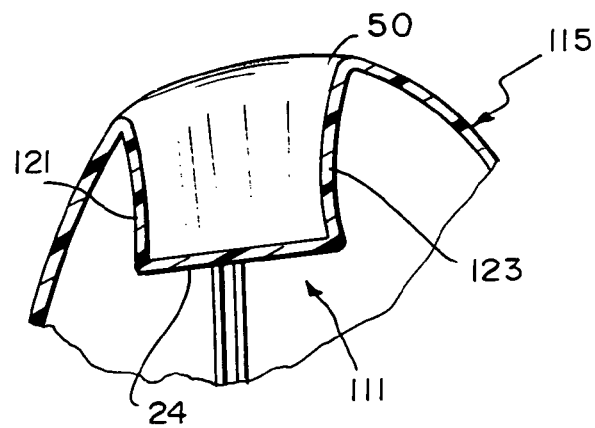
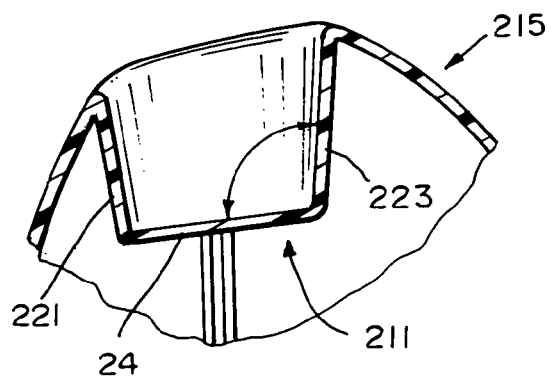
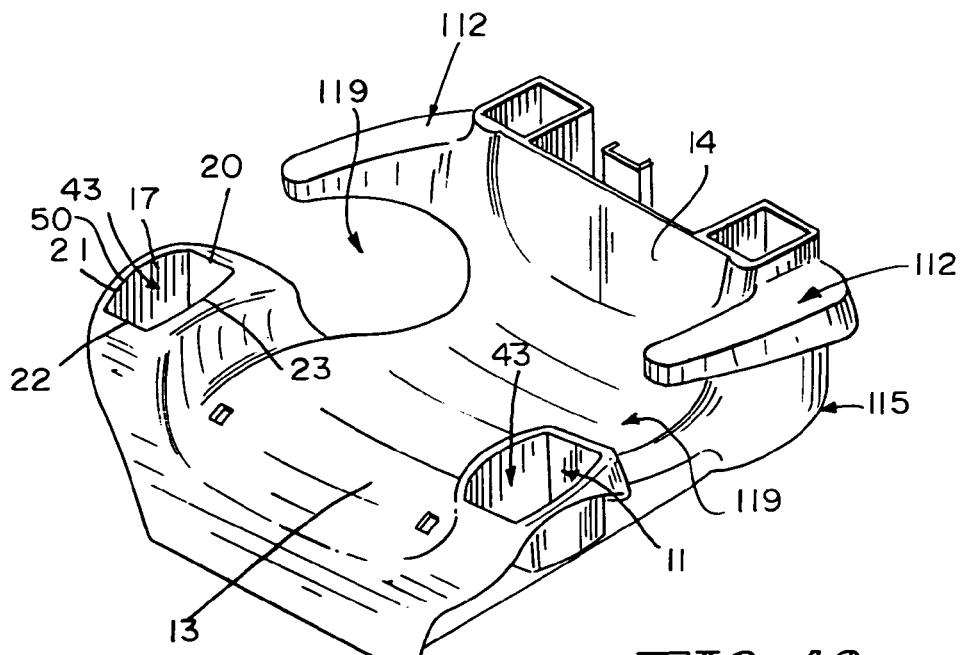

MONOLITHIC CONTAINER HOLDER

BACKGROUND

The present disclosure relates to a container holder, and in particular to a monolithic container holder. More particularly, the invention relates to a container holder for holding round and rectangular containers.

SUMMARY

A monolithic container holder in accordance with the present disclosure includes a container receiver formed to include a top surface and a receptacle depending from the top surface. The receptacle includes a bottom wall, a pair of end walls having a height extending between the top surface and the bottom planar wall, and a pair of side walls.

Each side wall consists essentially of a concave curved section. The concave curved sections are spaced apart and arranged to receive a round container therein. The end walls are spaced apart and arranged to receive a rectangular container therein. A first of the end walls is arranged to extend between and interconnect front-end edges of the concave side walls and a second of the end walls is arranged to extend between and interconnect rear-end edges of the concave side walls.

BRIEF DESCRIPTION OF THE DRAWINGS

The detailed description particularly refers to the following figures in which:

FIG. 6 is a top view of the container holder;
FIG. 7 is a perspective view of a first type of container;
FIG. 8 is a perspective view of a second type of container;
FIG. 9 is a perspective view of a third type of container;
FIG. 10 is a view of a second embodiment of a container holder in accordance with the present disclosure;
FIG. 11 is a view of a third embodiment of a container holder in accordance with the present disclosure;
and
FIG. 12 is a perspective view of another embodiment according to the present disclosure.

DETAILED DESCRIPTION

Figure 1:
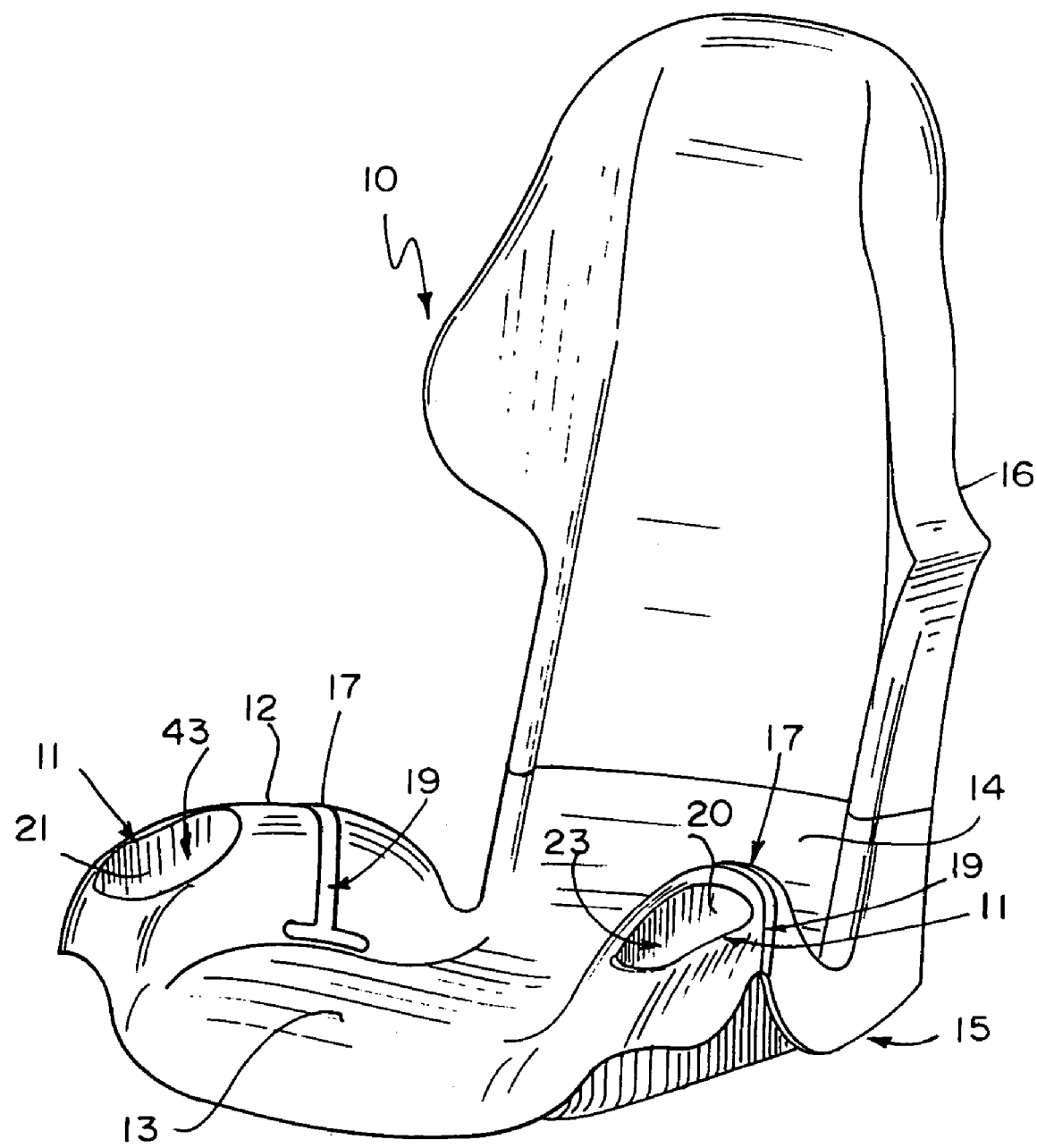
FIG. 1 is a front view of the embodiment of FIG. 1.
Figure 2:
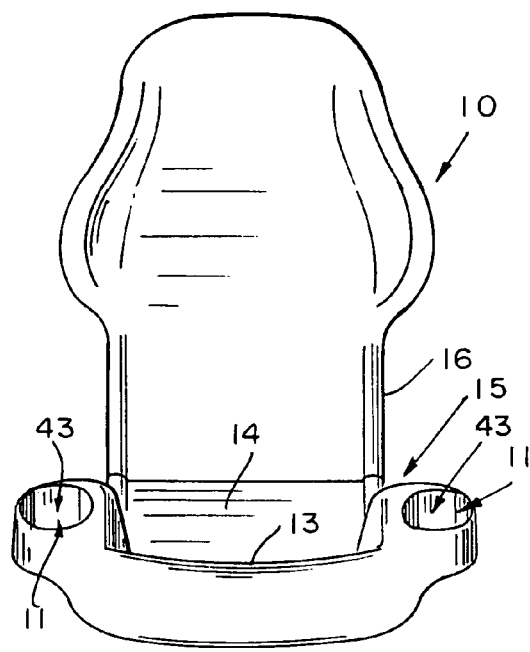
FIG. 2 is a front view of the embodiment of FIG. 1.

A juvenile vehicle seat 10 with container holders (cup holders) 11 formed in arms 12 is shown, for example, in FIG. 1. Each cup holder 11 is formed to receive at least a round container such as cup 51 as suggested in FIGS. 6 and 7 and a rectangular container such as juice box 151 as suggested in FIGS. 6 and 8 and a lip-shaped container such as juice pouch 251 as suggested in FIG. 9.

The juvenile vehicle seat 10 includes seat bottom 13, lower back portion 14, spaced-apart arms 12 rising upwardly from seat bottom 13, and cup holders 11. Monolithic body 15 is made of, for example, plastics material which may be formed by molding. As seen in FIG. 1, there are two cup holders 11 and seat bottom 13 is arranged to lie between cup holders 11. Each cup holder 11 is located at an outer end of one of arms 12 of monolithic body 15. Each cup holder 11 forms a cavity which extends into monolithic body 15. In an illustrative embodiment, cup holders 11 do not protrude outwardly from any exterior surface of monolithic body 15.

An upper backrest 16 may be attached to monolithic body 15 by any of a snap-fit connection, a pivot connection, and/or any suitable connection permanently or temporarily fixing upper backrest 16 to monolithic body 15. Reference is hereby made to a U.S. patent application entitled "Juvenile Vehicle Seat with Quick-Connect Backrest," filed on Nov. 29, 2004, for a description of a suitable snap-fit connection, which application is hereby incorporated by reference herein.

As seen in FIGS. 2-5, cup holder 11 may be monolithically incorporated as part of a juvenile vehicle seat 10 which includes a seat bottom 13 and lower back portion 14 monolithically coupled to seat bottom 13. Upper backrest 16 is mounted to lie in a fixed position relative to monolithic body 15 as suggested in FIGS. 1-5.

Figure 3:
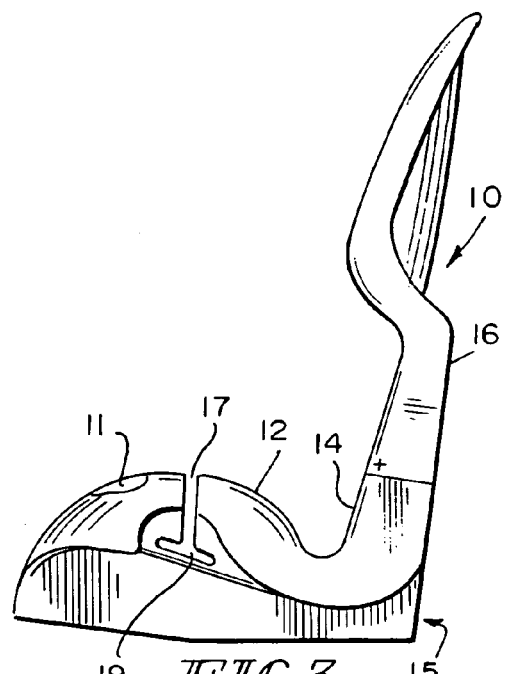
FIG. 3 is a side view of the embodiment of FIG. 1.
Figure 4:
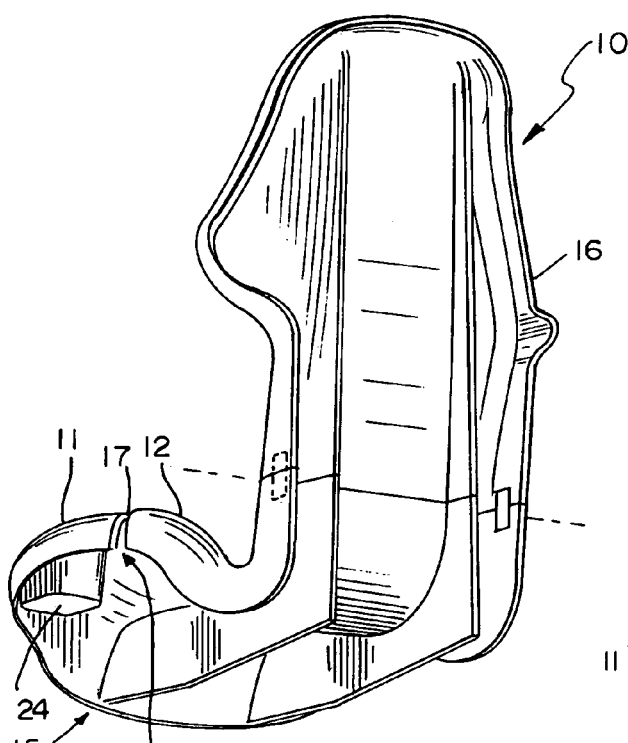
FIG. 4 is a cut-away perspective view of the embodiment of FIG. 1.
Figure 5:
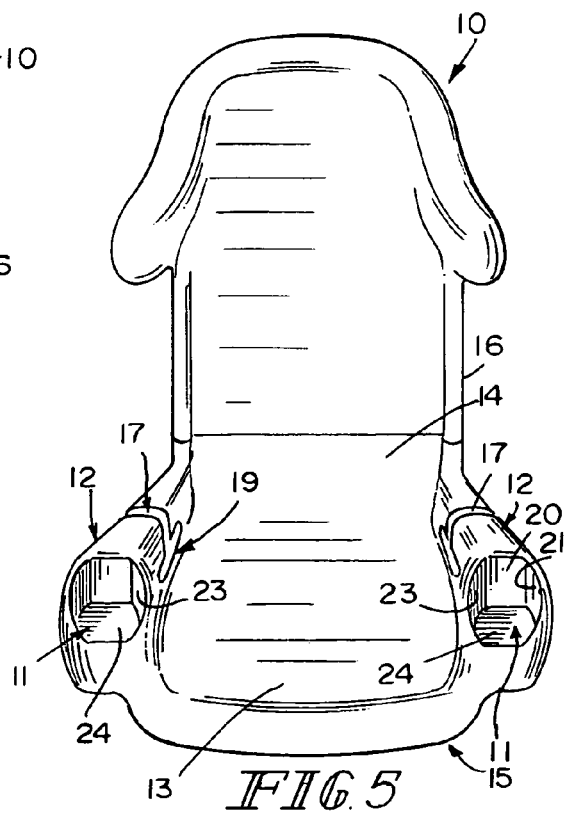
FIG. 5 is a front-elevated view of the embodiment of FIG. 1.

An opening 17 shown, for example, in FIG. 3, is provided in arm 12 to provide for access to a belt receiver 19 formed in monolithic body 15 for vehicle lap or shoulder belts. FIG. 12 shows an exemplary embodiment wherein arm 112 is configured and arranged to include a belt receiver 119 to accommodate lap and shoulder belts.

Cup holder 11 is shown in FIG. 6. Cup holder 11 terminates at interior edge 50 and has a back end wall 20, an outside side wall 21, a front end wall 22, an inside side wall 23, and a bottom 24. Bottom 24 is illustratively a planar or flat wall. Walls 21, 23 are concave surfaces arranged to face toward one another and curved outwardly away from the interior of cup holder 11.

Cup holder 11 is designed to hold containers 51, 151, and 251 shown in FIGS. 7-9 in a manner suggested, for example, in FIG. 6. Concave walls 21, 23 are adapted to extend in spaced-apart relation to one another between first and second end walls 20, 22 to mate with or associate with many containers of various shapes.

A round container 51 shown in FIG. 7 includes a round base 27 and a "tubular" or somewhat conical side wall 29. A phantom outline of round container 51 is shown in cup holder 11 of FIG. 6.

A container 151 shown in FIG. 8 has a rectangular base 30, top 31, two side walls 32, and two end walls 33. Each side wall in container 151 has a length 132 of about 2.125 inches and a height 131 of about 4.125 inches and a width 133 of about 1.625 inches. A phantom outline of rectangular container 151 is also shown in cup holder 11 of FIG. 6.

The "juice pouch" container 251 in FIG. 9 is, for example, made from two side walls 40 and a bottom wall 41. Side walls 40 are joined at top edge 42 and side edges 43. Bottom wall 41 is joined along its periphery to bottom edge 44 of side walls 40 to form an enclosure 45. Side walls in the container 251 of FIG. 9 are typically about 3.875 inches long and 5.25 inches high when container 251 is empty and the walls are flat and abut each other. When a liquid is placed in container 251, it expands the side walls apart which draws side wall edges 43 together so that the width from edge 43 to edge 43 is reduced and container 251 is provided with a somewhat "lip-shaped" configuration. Walls 40 and bottom wall 41 of container 251 of FIG. 9 are flexible so as to enable container 251 to assume different shapes and to fit into cup holders 11 of varying sizes and shapes.

Cup holder 11 particularly is suited to receive round containers 51 and rectangular containers 151, but will accommodate containers of varying shapes and sizes including lip-shaped container 251. Side walls 21 and 23 are arcuate to provide support surfaces and thus to accommodate curved containers 51. Because of the serial "connection" of flat back end wall 20, concave outside wall 21, front end wall 22, and concave inside wall 23 to omit any inwardly projecting corners, the volume of interior region 43 of cup holder 11 is maximized and the "cleanability" of bottom 24 and walls 20-23 is enhanced.

In the embodiment shown in FIG. 8, the back and front, or end, walls 20 and 22, respectively, are 1.94 inches in length and are spaced three inches apart by outside and inside walls, 21 and 23, respectively. Back end wall 20 and front end wall 22 are flat in an illustrative embodiment to provide support surfaces and thus to accommodate containers such as container 151 with one or more flat sides. These dimensions may be varied, but these are preferred dimensions since it has been found that they are particularly advantageous for use with containers of optimal sizes and shapes. That is, they are in a range of sizes and shapes that will accommodate containers of a size intended for use by juveniles. Edges 50 of cup holder 11 are beveled or rounded to provide adequate "draft" to permit easier insertion and removal of a container and to provide blunt edges that are less likely to contact persons or articles. Cup holder 11 does not have interior protruding surfaces or corners that will snag, cut, mar, or otherwise damage a container as it is inserted, held, and/or removed.

As seen, for example, in FIG. 1, outside side wall 21 and inside side wall 23 are curved or bowed outwardly, away from the interior region 43 of cup holder 11. The curved sides terminate at flat back wall 20 and flat front wall 22. This configuration is adapted for holding a round container 51. Many round containers 51 taper from the top to the bottom and the configuration shown in FIG. 1 enables round containers 51 of various diameters to be held firmly in an upright position in the cup holder dependent on where the taper engages the interior surface of the walls.

A cup holder that provides an interference fit is hereby defined herein as a cup holder that has an interior diameter smaller than a corresponding diameter of the container. Examples of such cup holders 111 and 211 are shown in FIGS. 10 and 11.

In the illustrated embodiment, monolithic container holder 11 includes a bottom wall 24 having, in series, a straight back end edge 241, a convex outside side edge 242, a straight front end edge 243, and a convex inside side edge 244 as shown, for example, in FIG. 6. Back end wall 20 is appended to straight back end edge 241 of bottom wall 24 and arranged to extend upwardly away from bottom wall 24. Front end wall 22 is appended to straight front end edge 243 of bottom wall 24 and arranged to extend upwardly away from bottom wall 24.

Curved outside side wall 21 is appended to convex outside side edge 242 and arranged to extend upwardly away from bottom wall 24. Curved outside side wall 21 has a rear-end edge appended to back end wall 20 and a front-end edge appended to front end wall 22 to cause curved outside side wall 21 to extend between and interconnect front and back end walls 20, 22.

Curved inside side wall 23 is appended to convex inside side edge 244 and arranged to extend upwardly away from bottom wall 24. Curved inside side wall 23 has a rear-end edge appended to back end wall 20 and a front-end edge appended to front end wall 22 to cause curved inside side wall 23 to extend between and interconnect front and back end walls 20, 22. Each of the curved inside and outside side walls 21, 23 has concave surfaces arranged to extend between front and back end walls 20, 22 and face toward one another to locate bottom wall 24 therebetween.

In an illustrative embodiment, each of front and back end walls 20, 22 is flat. Each of the concave surfaces provided on side walls 21, 23 has a radius of curvature. The radius of curvature of the concave surface of curved outside side wall 21 is about equal to the radius of curvature of the concave surface of curved inside side wall 23.

In an illustrative embodiment, each of front and back end walls 20, 22 has a width extending between curved inside and outside side walls 21, 23. The radius of curvature of each of the concave surfaces provided on side walls 21, 23 is greater than the width of each of front and back end walls 20, 22.

FIG. 10, walls 121, 123 are shown to curve inwardly toward the interior and/or center of cup holder 111. The curvature in FIG. 10 is exaggerated for illustration purposes. The curvature shown achieves a minimum diameter for cup holder 111 about midway between bottom 24 and perimeter edge 50. In an illustrative embodiment, cup holder 111 minimum diameter is closer to edge 50 than midway between bottom 24 and edge 50. Walls 121, 123 having a slight curvature (as shown in FIG. 10) provide enhanced stability for the container. Walls 121, 123 may be made flexible (e.g., the wall thickness may be thin so as to be flexible) to expand slightly to accommodate a container of slightly greater dimension than the distance between the closest points of walls 121 and 123. The flexibility of the container walls enhances the ability of cup holder 111 in monolithic body 115 to hold firmly the container 51 and to accommodate containers of different sizes.

In FIG. 11, walls 221, 223 of cup holder 211 are shown to slant with respect to a line perpendicular to the bottom 24. The slant in FIG. 11 is exaggerated for illustration purposes. Actually a "draw" or slant of about 2° from vertical (a line perpendicular to bottom 24) is preferred. This allows the monolithic body to be removed from a mold and also allows a container to be inserted into and removed from cup holder 11 easily. Also, a container whose bottom is larger than the width of bottom 24 may be inserted into cup holder 211 and held by an interference fit at a point at, or above, the bottom. This is possible in part because containers are flexible and when the container bottom becomes wedged into cup holder 211, the sides 221, 223 tend to expand and the container bottom tends to be distorted to fit the space provided. Thus, an interference fit is formed between the container and cup holder 211 in monolithic body 215. The expansion of the sides and the interference fit prevents the container from moving around in cup holder 211. As seen in FIG. 11, walls 221, 223 of cup holder 211 are slanted with respect to each other. Front and back walls 20 and 22 similarly may be slanted to diverge upwardly from the bottom 24. Each of the outwardly curved walls 221 and 223 may have a height equivalent to the height of the end walls 20 and 22.

As best seen in FIG. 12, cup holder walls may all be the same height. That is, the distance from bottom 24 to edge 50 of opening 17 may be the same for each of back wall 20, front wall 22, inside side wall 23, and outside side wall 21. This configuration provides excellent stability for retaining a container 51 in cup holder 11. FIG. 1 shows front wall 22 to be shorter than back wall 20. That is, edge 50 on front wall 22 is closer to bottom 24 than edge 50 on back wall 20. This configuration facilitates insertion and removal of some containers. Reference is hereby made to a U.S. patent application entitled "Juvenile Vehicle Seat Base With Cup Holder," filed on Nov. 29, 2004, for a description of a suitable monolithic seat base, which application is hereby incorporated by reference herein.

The invention claimed is:

1. A monolithic container holder comprising
an aperture in a support surface,
opposing curved side walls extending downwardly from the support surface, opposing flat end walls extending downwardly from a convex upper end of the support surface, and a bottom joining the curved side walls and flat end walls to form a cavity extending below the aperture and the support surface with the opposing curved side walls terminating at the opposing flat end walls, wherein the support surface, bottom, opposing curved side walls, and opposing flat end walls are a monolithic body;

wherein the height of one of the opposing flat end walls is less than the height of the other, and wherein a container held in the aperture is surrounded by the opposing curved side walls and the opposing flat end walls.

2. The monolithic container holder of claim 1, further comprising means for firmly holding one of a round container or a rectangular container.

3. The monolithic container holder of claim 1, further comprising means for firmly holding a round container and a rectangular container.

4. The monolithic container holder of claim 3, further comprising means for supporting round container surfaces and means for supporting flat container surfaces.

5. The monolithic container holder of claim 2, wherein the cavity comprises means for firmly holding one of a container having a curved bottom of a diameter of up to about two inches or a rectangular container having a length or width of up to about three inches.

6. The monolithic container holder of claim 2, wherein the cavity comprises means for holding a round container having a bottom diameter of up to about two inches and a rectangular container having a length or width of up to about three inches.

7. The monolithic container holder of claim 1, wherein the side walls diverge outwardly from the bottom to the top.

8. The monolithic container holder of claim 7, wherein the side walls diverge at an angle of up to about 4°.

9. The monolithic container holder of claim 1, further comprising a beveled edge at the opening in the monolithic body.

10. The monolithic container holder of claim 1, further comprising a rounded edge at the opening in the monolithic body.

11. The monolithic container holder of claim 1, wherein each opposing curved side wall consists of essentially an outwardly curved section.

12. The monolithic container holder of claim 1, wherein the opposing curved side walls cooperate to define a round-receiver for receiving a container having a circular cross section therebetween.

13. The monolithic container holder of claim 1, wherein the opposing flat end walls cooperate to define a rectangle-receiver for receiving a container having a rectangular cross section therebetween and the bottom provides a container-receiving floor.

14. A monolithic container holder comprising an aperture in a support surface, opposing curved, slanted side walls extending downwardly from a convex upper end of the support surface, opposing flat end walls extending downwardly from the support surface, a bottom joining the curved, slanted side walls and flat end walls to form a cavity extending below the aperture and the support surface with the opposing curved, slanted side walls terminating at the opposing flat end walls, and wherein the support surface, bottom, opposing curved, slanted side walls, and opposing flat end walls are a monolithic body.

15. A monolithic container holder comprising an aperture in a support surface, opposing curved, slanted side walls extending downwardly from a convex upper end of the support surface, opposing flat end walls extending downwardly from the support surface, and a bottom joining the curved, slanted side walls and flat end walls to form a cavity extending below the aperture and the support surface with the opposing curved, slanted side walls terminating at the opposing flat end walls, wherein the support surface, bottom, opposing curved, slanted side walls, and opposing flat end walls are a monolithic body;

wherein the height of one of the opposing flat end walls is less than the height of the other, and wherein a container held in the aperture is surrounded by the opposing curved, slanted side walls and the opposing flat end walls.

* * * * *

UNITED STATES PATENT AND TRADEMARK OFFICE
CERTIFICATE OF CORRECTION

PATENT NO.         : 7,584,867 B2                                     Page 1 of 1
APPLICATION NO. : 10/999023
DATED              : September 8, 2009
INVENTOR(S)        : Philip W. Burbrink It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1303 days.

Signed and Sealed this

Fourteenth Day of September, 2010

David J. Kappos
*Director of the United States Patent and Trademark Office*